Figure 1:
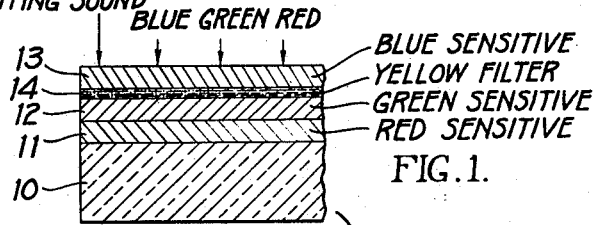

Feb. 11, 1941.  R. M. EVANS ET AL  2,231,663

NEUTRAL GRAY SOUND TRACK

Filed May 6, 1938

AFTER NEGATIVE DEVELOPMENT

AFTER BOTTOM LAYER EXPOSURE
AND BLUE-GREEN DEVELOPMENT

AFTER EXPOSURE AND DEVELOPMENT
OF SOUND TRACK

AFTER COLOR DEVELOPMENT OF TOP
LAYERS AND REMOVAL OF SILVER

RALPH M. EVANS
WESLEY T. HANSON, JR.
INVENTOR

BY
ATTORNEYS

Patented Feb. 11, 1941

2,231,663

UNITED STATES PATENT OFFICE 2,231,663

NEUTRAL GRAY SOUND TRACK

Ralph M. Evans and Wesley T. Hanson, Jr., Rochester, N. Y., assignors to Eastman Kodak Company, Rochester, N. Y., a corporation of New Jersey Application May 6, 1938, Serial No. 206,447

6 Claims. (Cl. 95—2)

This invention relates to sound records in photographic film and particularly to a method for producing a sound track in multi-layer film in which colored images are produced.

The essential feature of a sound record in photographic film is that it should be opaque to the light used in reproducing the sound. Since most photo-electric cells used in sound reproduction are sensitive to red and infra-red light, the sound track in motion picture film should absorb light in these regions of the spectrum. It is desirable for the sound image to absorb light in the red and infra-red as well as in the visible portion of the spectrum and, although this condition is fulfilled by a metallic silver image, it is not always fulfilled by the dyes used in photographic color processes.

In U. S. patent application, Serial No. 185,700, filed January 19, 1938, by Mannes, Godowsky and Wilder there is described a process of producing colored photographic images in multi-layer film. According to the process described therein, a photographic film having differentially sensitized superposed layers, is developed to a negative after exposure and is then treated by a series of steps to form positive colored images in the layers. The first step consists in uniformly exposing the film through the support to red light to form a latent image in the lower red-sensitive layer which is then developed in a blue-green color-forming developer. By successive exposure and development steps, magenta and yellow images are formed in the upper layers together with metallic silver negative and positive images in all of the layers. The metallic silver images are then removed by some treatment which dissolves the silver but does not affect the dye images, such as by successive baths of potassium ferricyanide and hypo.

When it is desired to produce a sound track in film of this type it is necessary either to develop colored images representing the sound track in all three layers so that a sufficiently opaque image is obtained, or to produce a metallic silver sound track by protecting the sound track area either before or after exposure of the picture area. The former method is undesirable since the combined colored images do not always afford good definition and absorb in the infra-red region, and the latter method necessitates the use of additional varnishing steps or other means for protecting the sound area during processing of the picture areas.

It is, therefore, an object of the present invention to provide a method for producing a sound track in multi-layer film in which colored images are formed. A further object is to provide a method for producing a sound track which is substantially neutral gray in density and which is, therefore, opaque to the light to which the reproducing lamp is sensitive. Other objects will appear from the following description of our invention.

These objects are accomplished by forming the sound track image by a coupling development, using a coupler which produces on development an image which is substantial neutral gray and is opaque to red and infra-red light.

In the accompanying drawing, Figs. 1 to 5 are enlarged sectional views showing various steps in the production of a sound track image, according to our invention.

According to a specific embodiment of our invention, a substantial neutral gray sound track image is produced by a color-forming development in a film similar to that described in Mannes, Godowsky and Wilder patent application, Serial No. 185,700. In the process described in that application a multi-layer film after exposure is developed to a negative image in an ordinary M-Q developer. The film is then universally exposed through the support to form a uniform positive latent image in the bottom layer which is red-sensitive and is then developed in a blue-green color-forming developer. The film is then successively exposed through the support to white light and the middle layer developed magenta and then from the emulsion side to white light and the top layer developed yellow. The combined negative and positive silver images formed in all of the layers by these development steps are then removed by treatment in successive baths of potassium ferricyanide and hypo.

In this process the yellow image may be introduced, after the blue-green development, by exposing the film to blue light from the emulsion side and then developing it in a yellow color-forming developer, the magenta image being introduced by use of a fogging color-forming developer.

We have found that the sound track image formed by coupler development, according to our invention, may be incorporated in film of this type at any stage subsequent to the blue-green development step, or in the case of fogging development of the middle layer, subsequent to the blue-green development step and prior to the fogging development. If the blue-green image is not developed first but is developed at a later stage in the process, the sound track image must be incorporated after the blue-green development. The image formed in the sound track portion of the invention, according to our invention, does not withstand the blue-green developers which have been used in this process. However, it is possible that with other blue-green coupler developers the sound track image can be formed either prior to or after the blue-green image and we do not wish to limit our invention to development of the sound track image only subsequent to the formation of the blue-green picture image.

Figure 2:
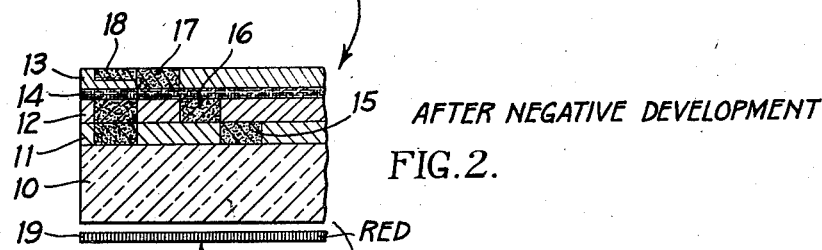

In our process of forming a sound track image in this type film, the film, after exposure, may contain a latent image of the sound track or the sound image may be printed at a later stage if the sound track area is protected against exposure. The film, as used in this process, is shown in Fig. 1 of the drawing in which 10 represents the support of any suitable cellulosic material, such as cellulose nitrate or cellulose acetate. The support 10 is coated with successive layers 11, 12 and 13 sensitive, respectively, to red, green and blue light. A yellow filter layer 14 is coated between layers 12 and 13 to prevent exposure of the layers 11 and 12 to blue light. This film is either exposed in the camera and the sound track printed at that time or is printed from a positive original film. As shown in Fig. 1, the sound track portion is uniformly exposed to yellow light after printing the sound track. This affects the two lower layers only. The film, after exposure and negative development, is represented by Fig. 2 and contains at this stage the negative images 15, 16 and 17 in the layers 11, 12 and 13. The filter layer 14 is not affected. The sound track is represented as a negative silver image 18 in the upper layer 13, the sound track portion of layers 11 and 12 being completely developed to metallic silver.

The uniform exposure of the sound track portion may also make use of red light instead of yellow light, in which case the bottom layer only would be affected, and the final sound track image would appear in the two upper layers. If the sound track portion is given no uniform light exposure, the final sound track image would appear in all three layers.

This film is then exposed through the support to red light, for example, through a red filter 19. This exposure affects only the lower layer 11 of the film and after exposure in a blue-green coupler developer, such as that described in application, Serial No. 185,700, the film contains in the bottom layer 11 a blue-green positive image 21. The film at this stage is shown at Fig. 3.

Figure 3:
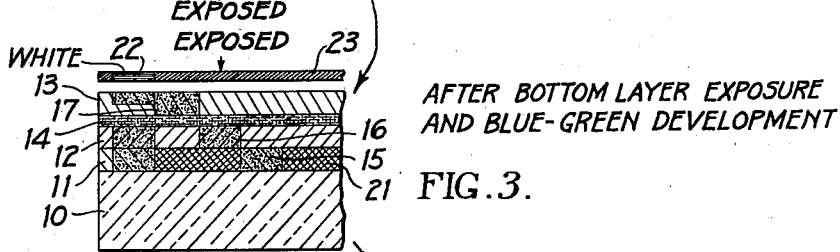

If the sound track is to be printed immediately, the film represented by Fig. 3 is exposed from the emulsion side to white light through a filter 22 having an opaque portion 23 covering the picture areas of the film. This exposure produces a latent image of the sound track in the sound track portion of the layer 13 only, since the sound track portions of the lower layers have already been exposed and developed.

The film is then developed in a coupler developer containing an aromatic amino developing agent, such as p-phenylene diamine and a coupler which produces a neutral gray image such as p-benzyl phenol. Developers suitable for this purpose are illustrated by the following examples:

*Example I*

| | | |
|---|---|---|
| Diethyl p-phenylene diamine | g | 3 |
| Sodium carbonate | g | 30 |
| Sodium sulfite | g | 6 |
| p-Benzyl phenol | g | 3 |
| Sodium hydroxide | g | 5 |
| Water to | liter | 1 |

*Example II*

| | | |
|---|---|---|
| 2 amino-5-diethyl amino toluene hydrochloride | g | 3 |
| Sodium sulfite | g | 6 |
| Sodium carbonate | g | 45 |
| Potassium bromide | g | 1 |
| Potassium thiocyanate | g | 1 |
| p-Benzyl phenol | g | 4 |
| Sodium hydroxide | g | 5 |
| Water to | liter | 1 |

Figure 4:
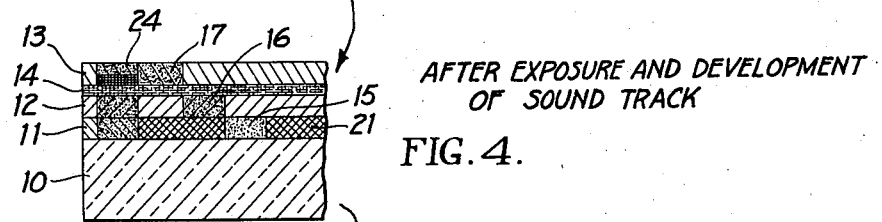
Figure 5:
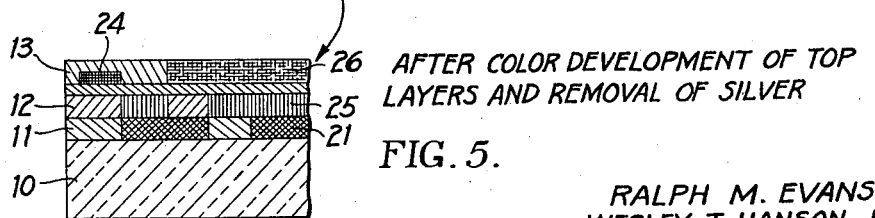

After this development step as illustrated in Fig. 4, the film contains a neutral gray dye and silver positive sound track image 24 in the upper layer 13 of the film. The film is then exposed through the support to white light and a magenta positive image developed in the middle layer 12 and then exposed from the emulsion side to white light and a yellow positive image developed in the upper layer 13 as described in application, Serial No. 185,700. The silver images in all of the layers are then removed by treatment of the film in a bath of potassium ferricyanide and potassium bromide followed by treatment in hypo. This treatment removes the positive and negative images in the picture area and the negative silver images in the sound track area. It also removes the yellow filter dye in layer 14 but it does not affect the sound track image 24. The film at this stage is represented by Fig. 5, and as shown therein it contains blue-green, magenta and yellow positive images 21, 25 and 26 in layers 11, 12 and 13, respectively, and neutral gray sound track image 24 in the layer 13.

The action of p-benzyl phenol in coupler developers is unique in that it appears to prevent the removal of the metallic silver formed in situ with the formation of the dye image when the film is treated in the ferricyanide and hypo baths. The final sound track image is, therefore, a combined silver and dye image which is substantially neutral gray in color and is highly satisfactory as a sound track image, since it absorbs light throughout the visible spectrum and also in the infra-red region. We do not wish to be limited to the use of p-benzyl phenol as a coupler developer of this purpose since any coupler compound might be used which would produce a neutral gray dye on development.

Our application Serial No. 200,507, filed April 6, 1938, now Patent No. 2,193,023, of March 12, 1940, describes a method of making a black and white image by development in a coupler developer producing a black image, such as p-benzyl phenol. The present application distinguishes over their prior application in the use of this type coupler development for the product of sound track images.

Although we have described our invention with particular reference to the color process described in application, Serial No. 185,700, it is to be understood that a sound track image produced according to our invention is suitable for numerous other photographic color processes particularly those in which a colored image is formed by a coupler development. For example, our process might be used to form a sound track image in a film of the type described in Mannes and Godowsky U. S. Patent No. 2,113,329, April 5, 1938, if the sound track is introduced subsequent to the blue-green development step. Other modifications might be made in the process described above, such as a fogging exposure of the middle layer of the film prior to magenta development rather than a light exposure of this layer.

The specific examples included herein are illustrative only and may be varied over wide ranges. Developers other than those specifically mentioned may be used, such as dimethyl p-phenylene diamine and other dialkyl p-phenylene diamines as well as dialkyl amino toluenes and other developers of this general class containing a primary amino group.

In addition to its use in color processes, our method of forming a sound track may be used in black and white film to form a substantially neutral gray sound track image. Other modifications of our invention are possible within the scope of the appended claims.

What we claim is:

1. The method of forming a sound track in photographic film which comprises developing the sound track in a coupler developer containing a p-benzyl phenol coupler and an aromatic amino developing compound.

2. The method of forming a sound track image in multi-layer photographic film which comprises color-forming a picture image in the film by color-forming development and a sound track image forming development and a sound track image in a coupler developer containing a p-benzyl phenol coupler compound and an aromatic amino developing compound.

3. The method of forming a natural color image and a sound track image in a multi-layer film having three differentially sensitized layers on one side of a transparent support which comprises forming a natural color picture image in the film by coupler development and a sound track image in at least one layer of the film by development in a coupler developer containing a p-benzyl phenol and a p-phenylene diamine developing compound.

4. The method of producing a multi-layer colored photographic record and a substantially neutral gray sound record on a sensitive element having three superposed layers sensitive, respectively, to the blue, green, and red regions of the spectrum and having between the layers sensitive to blue and green a filter material absorptive of blue light and resistant to ordinary developing baths but removable in a bleach bath, which process comprises forming by exposure and development silver color component negative images in the picture area of three layers and in the upper layer of the sound track area, and uniformly exposing and developing the sound track area of the lower layers, exposing the element to red light whereby a latent image is formed in the red sensitive layer and developing in said layer by a color-forming development an image of silver and a blue-green dye, uniformly exposing only the sound track area and developing in the blue-sensitive layer by a color-forming development a neutral gray image composed of silver and a dye protecting the silver from subsequent bleaching, and then successively exposing and developing the remaining layers to form in the picture areas thereof images of colors complementary to light of the spectral region to which those layers are sensitive, and thereafter submitting the element to a bleach bath in which the filter layer and all of the silver images except the positive sound image are removed.

5. The method of producing a multi-layer colored photographic record and a substantially neutral gray sound record on a sensitive element having three superposed layers sensitive, respectively, to the blue, green, and red regions of the spectrum and having between the layers sensitive to blue and green a filter material absorptive of blue light and resistant to ordinary developing baths but removable in a bleach bath, which process comprises forming by exposure and development silver color component negative images in the picture area of all three layers and in the upper layer of the sound track area, and completely developing the sound track area of the two lower layers to metallic silver, exposing the element to red light whereby a latent image is formed in the red sensitive layer and developing in said layer by a color-forming development an image of silver and a blue-green dye, uniformly exposing only the sound track area and developing in an outer layer by a color-forming development a neutral gray image composed of silver and a dye protecting the silver from subsequent bleaching, and then successively exposing and developing the picture area of the outer layer to light of the spectral region to which it is sensitive, developing the middle layer in a fogging, color-forming developer which produces an image complementary to the color to which that layer is sensitive, and removing the filter material and all silver images except the positive sound track image.

6. In the process of producing a multi-colored photographic record and a sound record in a sensitive element having three superposed differentially sensitized layers in which negative silver color component images are formed by exposure and development and positive images of silver and dye are formed by re-exposure and color redevelopment and the silver images then removed, the steps of forming, immediately after the first exposure and development, in one of the outer layers by differential color exposure and color re-development a combined silver and blue-green dye image, forming in the layer farthest from the support by color development a combined neutral gray silver and dye sound track image, the silver of the sound track image being protected by the dye from subsequent bleaching, and then exposing the middle layer to light passing through the developed positive and negative images of the blue-green outer layer.

RALPH M. EVANS.
WESLEY T. HANSON, JR.